(12) United States Patent
Bridge

(10) Patent No.: US 7,434,755 B2
(45) Date of Patent: Oct. 14, 2008

(54) MEAT SHREDDER APPARATUS

(76) Inventor: Terry A. Bridge, P.O. Box 45, 614 Kennedy St., Palmyra, NJ (US) 08065-0045

(*) Notice: Subject to any disclaimer, the term of this patent is extended or adjusted under 35 U.S.C. 154(b) by 205 days.

(21) Appl. No.: 11/484,148

(22) Filed: Jul. 10, 2006

(65) Prior Publication Data

US 2008/0041983 A1    Feb. 21, 2008

(51) Int. Cl.
*B02C 1/08* (2006.01)
*B02C 7/00* (2006.01)
*B02C 7/12* (2006.01)
*B02C 13/28* (2006.01)
*B02C 17/20* (2006.01)
*B02C 23/02* (2006.01)

(52) U.S. Cl. .................................. 241/282; 241/282.1

(58) Field of Classification Search ................. 241/280, 241/282, 282.1
See application file for complete search history.

(56) References Cited

U.S. PATENT DOCUMENTS

| | | | | |
|---|---|---|---|---|
| 3,530,914 A | * | 9/1970 | Lasar | 241/281 |
| 4,127,236 A | * | 11/1978 | Lasar | 241/37.5 |
| 4,205,798 A | * | 6/1980 | Bang | 241/224 |
| 5,405,093 A | * | 4/1995 | Bozarth | 241/34 |
| 5,961,059 A | * | 10/1999 | Kroger | 241/236 |

* cited by examiner

*Primary Examiner*—Bena Miller
(74) *Attorney, Agent, or Firm*—Zachary T. Wobensmith, III

(57) ABSTRACT

Apparatus for shredding or pulling pieces of meat, which includes a feed hopper carried on a body, a removable shredder roller assembly in the body for shredding the meat, which includes a shredder roller, and a backer plate, which can be adjusted to vary the texture of the shredder meat product, and an electric motor to rotate the shredder roller.

4 Claims, 6 Drawing Sheets

MEAT SHREDDER APPARATUS

BACKGROUND OF THE INVENTION

1. Field of the Invention

This invention relates to apparatus for shredding pieces of meat, such as pork. The apparatus includes a body with a meat feed hopper, and a shredder roller assembly to shred or pull the meat, with provisions for varying the texture of the finished product.

2. Description of the Prior Art

There are many machines available to slice, grind or cut up large pieces of meat into smaller pieces.

For certain varieties of meat, such as pork, it is desirable to pull or shred the meat into smaller pieces, as pulled or shredded pork is more palatable to many consumers' tastes. It is also useful, particularly when the meat is tough; to shred or pull it, as the resulting product is considerably more tender than if the meat had been sliced or diced into smaller pieces. The pulling or shredding acts to tenderize the meat.

No satisfactory apparatus is currently available for shredding or pulling pork that is similar to the apparatus of the invention.

SUMMARY OF THE INVENTION

This invention relates to a meat shredding apparatus for shredding or pulling pieces of meat into smaller pieces.

The apparatus includes a feed hopper into which meat is fed and delivered to a body, which contains a motor driven shredder roller, which contacts the meat and feeds it between a shredder roller and an adjustable backer plate, where it is pulled or shredded into smaller pieces, and delivered to a container for further processing or use.

The principal object of the invention is to provide apparatus for pulling or shredding pieces of meat into smaller pieces.

A further object of the invention is to provide apparatus of the character aforesaid, wherein the finished texture of the product can be varied from coarse to fine.

A further object of the invention is to provide apparatus of the character aforesaid, which is durable and long lasting.

A further object of the invention is to provide apparatus of the character aforesaid, which is easy to service, and to clean.

A further object of the invention is to provide apparatus of the character aforesaid which can be readily disassembled for repair and maintenance.

A further object of the invention is to provide apparatus of the character aforesaid which is particularly suitable for pulling or shredding pork.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

Figure 1:
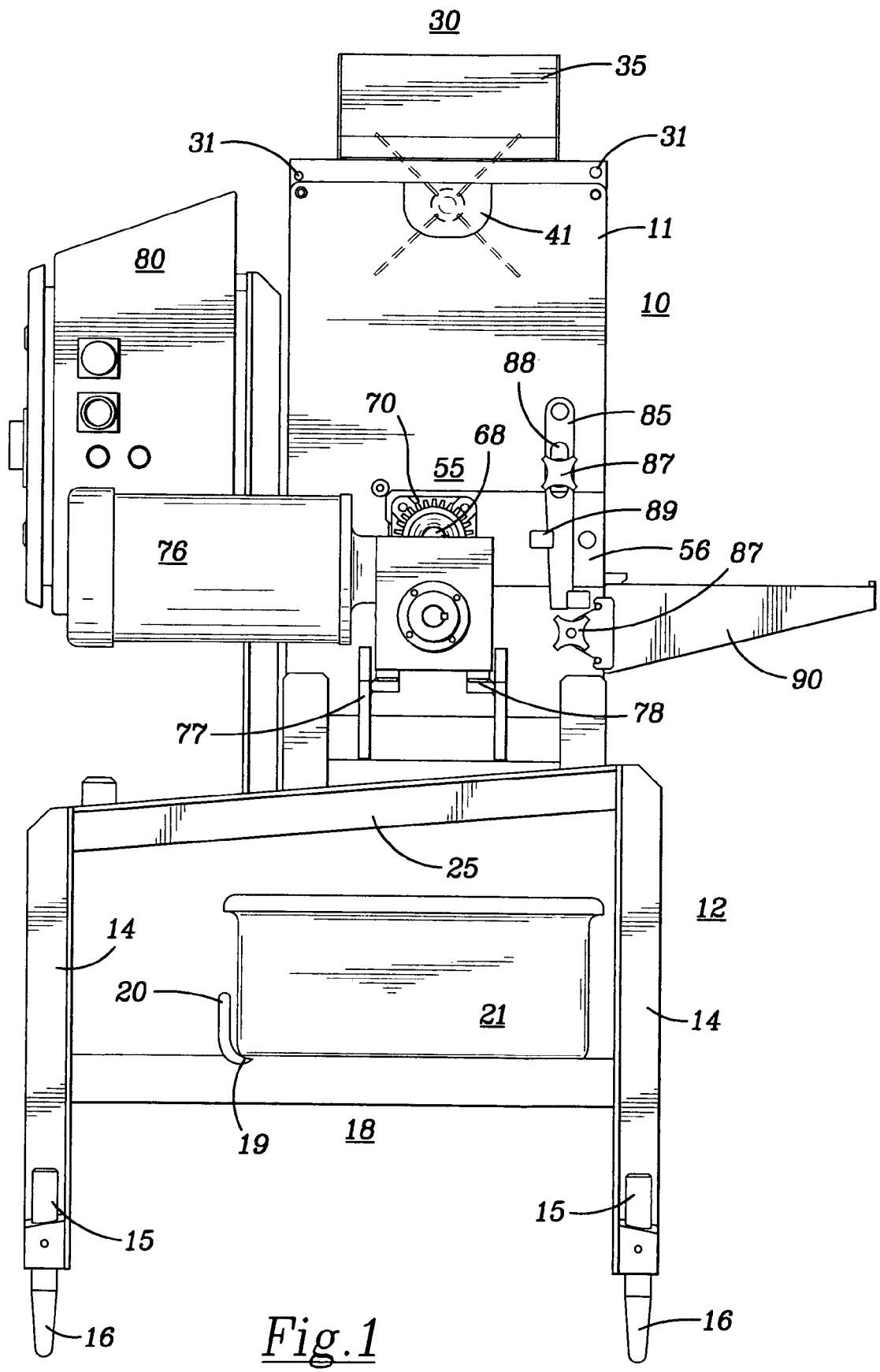
FIG. 1 is a right side elevational view of the meat shredder apparatus of the invention.

It should, of course, be understood that the description and drawings herein are merely illustrative and that various modifications and changes can be made in the structures disclosed without departing from the spirit of the invention.

Like numerals refer to like parts throughout the several views.

DESCRIPTION OF THE PREFERRED EMBODIMENT

When referring to the preferred embodiment, certain terminology will be utilized for the sake of clarity. Use of such terminology is intended to encompass not only the described embodiment, but also technical equivalents, which operate and function in substantially the same way to bring about the same result.

Referring now more particularly to the drawings and FIGS. 1-10, an embodiment of the meat shredder apparatus 10 is therein illustrated. The apparatus 10 includes an outer body 11, preferably of stainless steel plate on a lower frame 12, which has four legs 14, which each have a machine foot 15, with a swivel wheel 16 resting on a floor (not shown). The frame 12 includes a horizontal rack 18 with spaced rods 19, which have at least one angled end 20, with a tub or container 21 thereon to receive shredded meat, to be described.

The legs 14 are joined at the top to a channel member 25, which is of rectangular configuration, and extends around the apparatus 10. Four vertically extending brackets 26 are provided, two at each side, which are secured to member 25, and to the body 11 by bolts 27 engaged in bosses 28 on body 11.

A feed hopper assembly 30, open at the top is provided on body 11, which is attached to body 11 by bolts 31 and 32. The assembly 30 has brackets 33 and 34, which have the bolts 31 and 32 therein, and vertical panels 35, 36, 37 and 38 extending upwardly from the brackets 33 and 34. The assembly 30 can pivot about bolts 31 when bolts 32 are removed for access into the interior of body 11.

The brackets 33 and 34 have cutouts 40, which have bearings blocks 41 therein, which are resting in cutouts 43 in vertical panels 44 and 45 of body 11. The bearings 41 are of half circular configuration with a shaft 46 of a paddle infeed wheel assembly 50, carried therein. The bearings 41 are preferably constructed of delrin plastic.

The shaft 46 has a four blade infeed paddle wheel 51 thereon, which assists in delivering pieces of meat (not shown) to be shredded as described below.

The body 11 adjacent the frame 12 has a shredder roller assembly 55 therein, which includes end plates 56 and 57, and connecting rods 58 which connect the plates 56 and 57.

A backer plate 60 spans the end plates 56 and 57.

The backer plate 60 has end plugs 61 in slots 62 in plates 56 and 57, with threaded rods (not shown) for horizontal movement of plate 60, to vary the consistency of the meat to be shredded, to be described.

The plate 60 is preferably constructed of Delrin plastic.

The end plates 56 and 57 have bearings 65 therein, which are carried in blocks 66 which are fastened to plates 56 and 57 by bolts 67.

A shaft 68 of a shredder roller 69 is carried in the bearings 65, and has a gear 70 thereon.

The shredder roller 69 has multiple tapered vanes 71.

The roller 69 is preferably of stainless steel, which is easy to clean, resistant to corrosion from moisture and the meat to be shredded.

Figure 2:
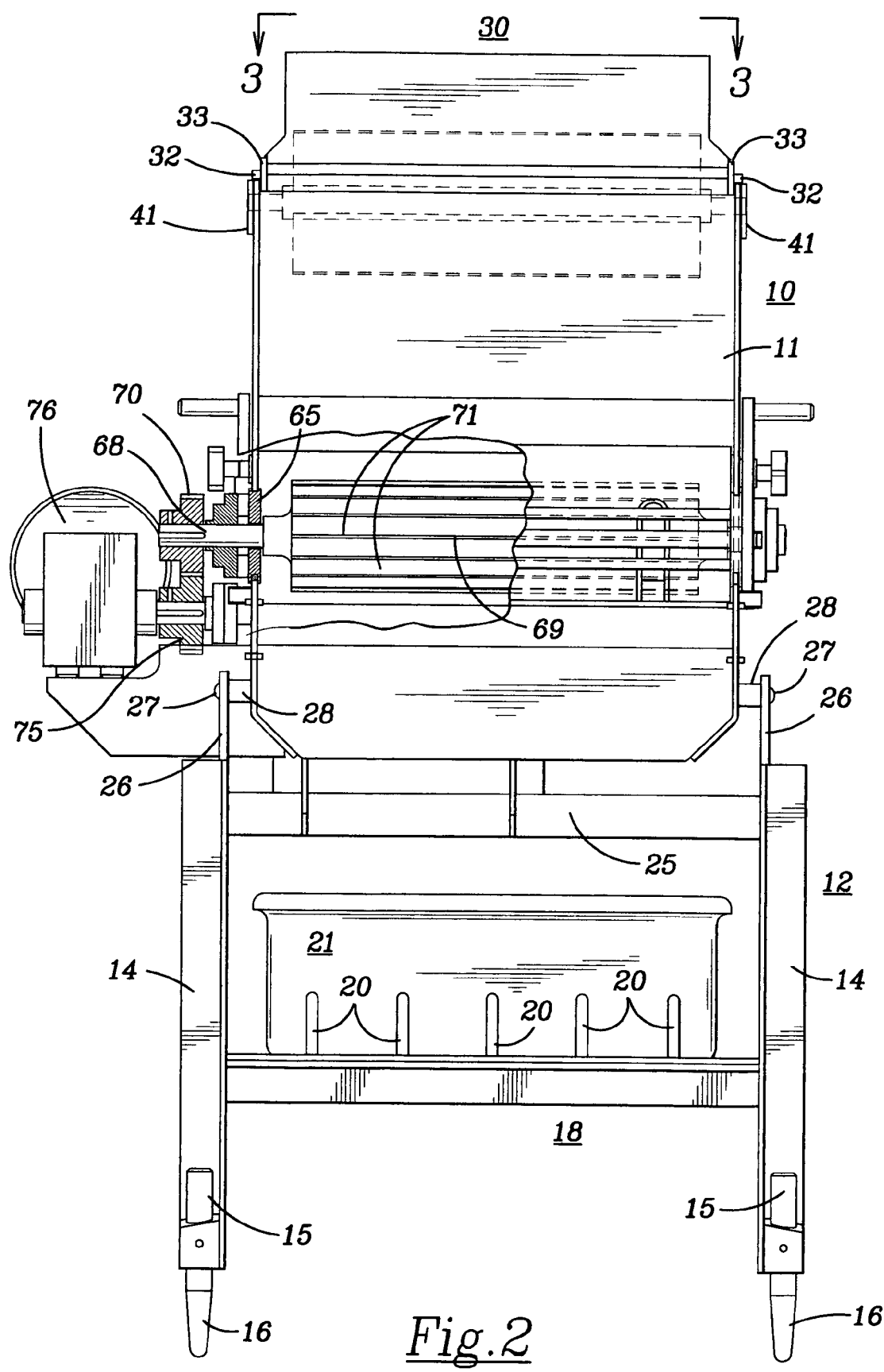
FIG. 2 is a rear elevational view, in partial section of the apparatus of FIG. 1.
Figure 3:
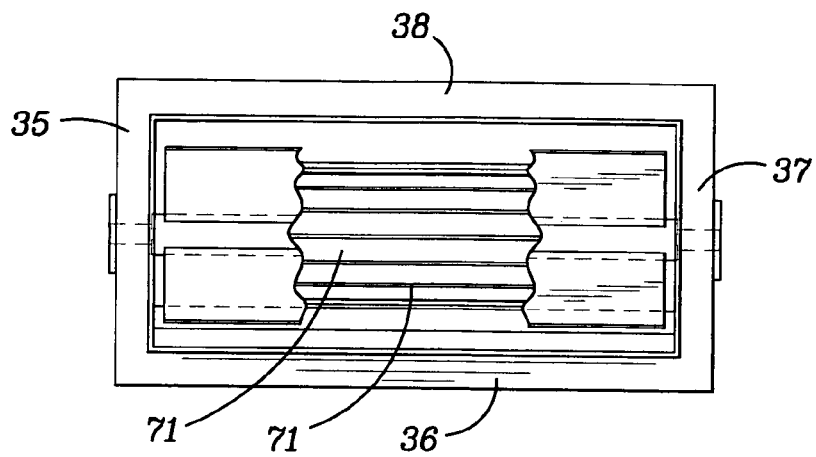
FIG. 3 is a horizontal sectional view, taken approximately on the line 3-3 of FIG. 2.

The gear 70 as shown in FIGS. 1 and 2 is engaged with an input gear 75 from a drive motor 76, which is mounted to body 11 by bracket 77, which is attached to support plates 78 of body 11.

The motor 76 is an electric motor of well known type and has a cord (not shown) connecting it to a control panel housing 80, also mounted on body 11.

The housing 80 has on-off switches 81 and 82, and an indicator light 83 to indicate when electric power is present, and is connected to a source of electric energy (not shown).

Figure 7:
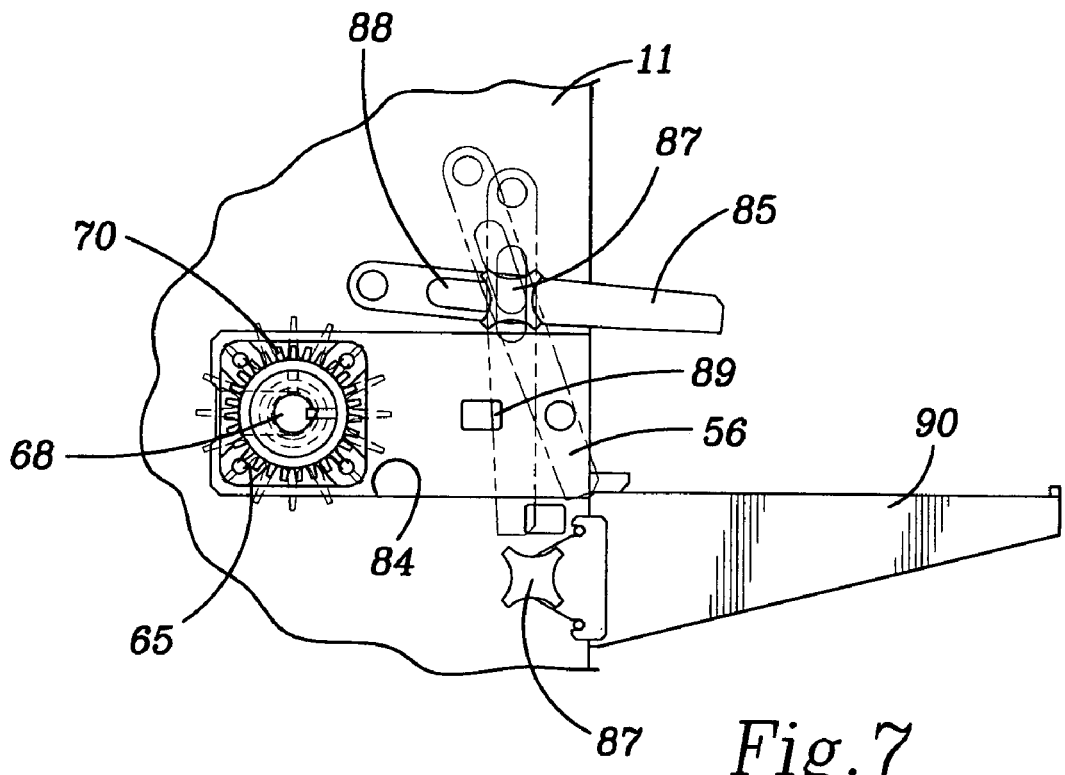
FIG. 7 is a fragmentary right side elevational view, showing the washing extensions in place and the shredder roller assembly ready to be removed.
Figure 8:
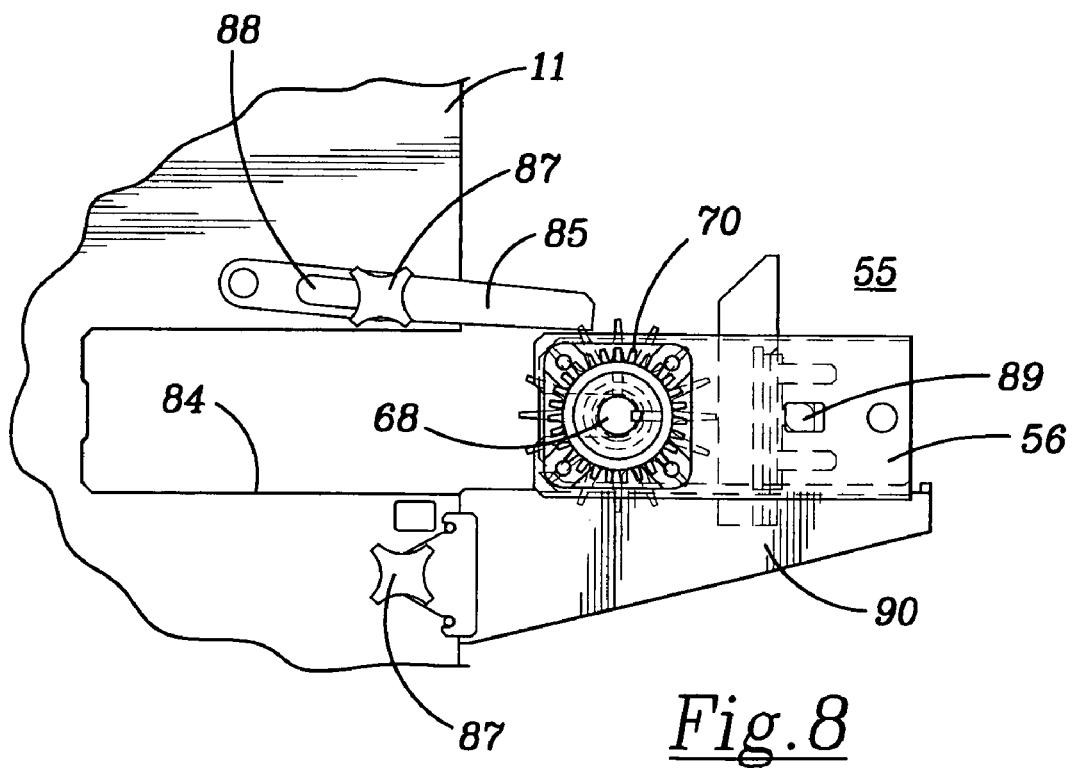
FIG. 8 is a view similar to FIG. 7, with the shredder roller assembly removed, and on the washing extensions for cleaning.
Figure 9:
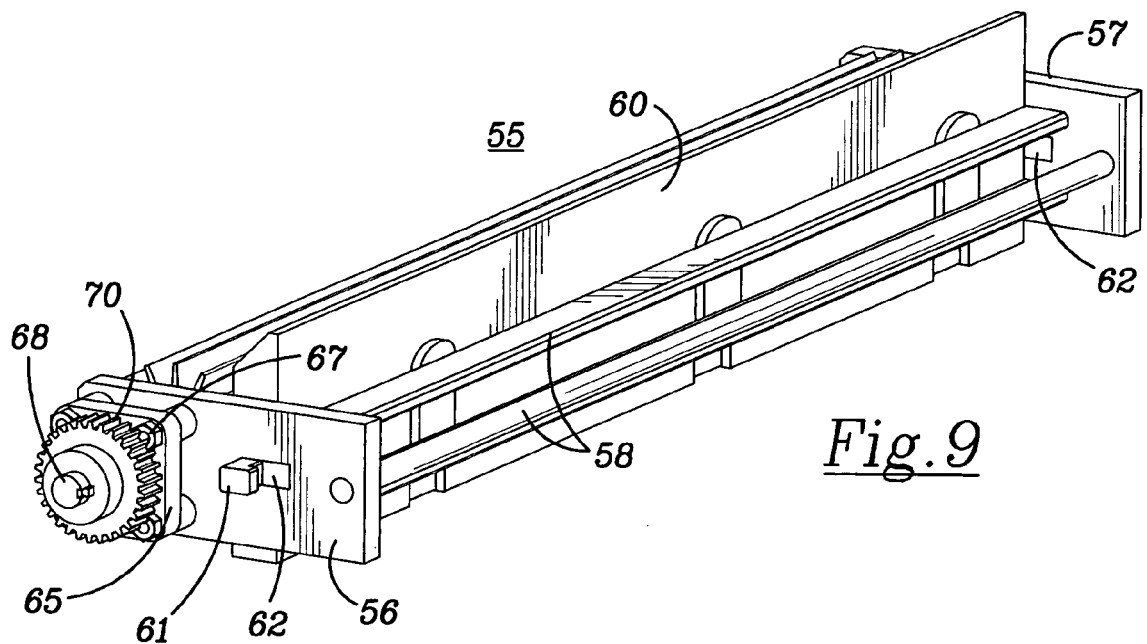
FIG. 9 is an enlarged, perspective view, of the shredder roller assembly of the invention.
Figure 10:
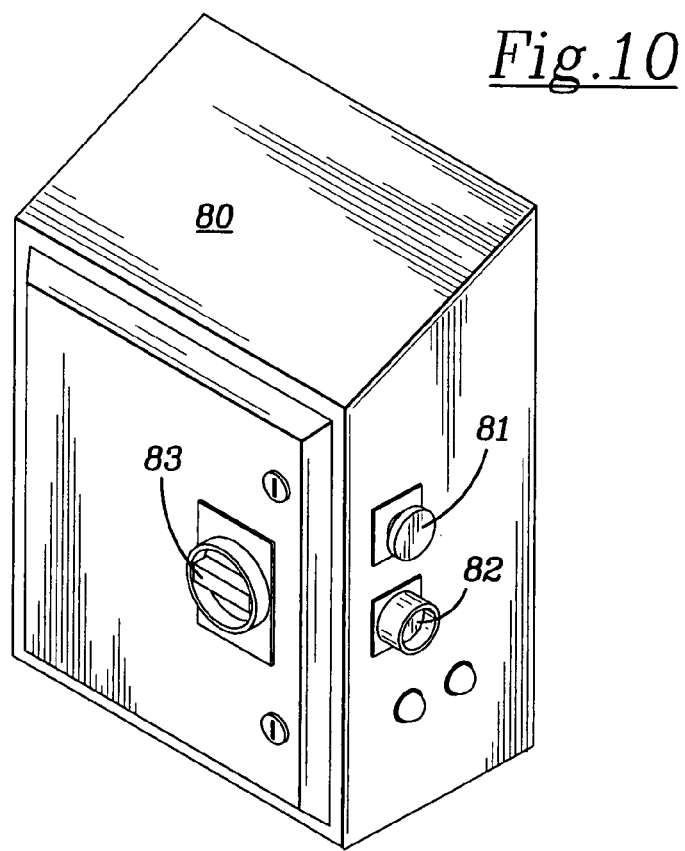
FIG. 10 is a perspective view of the control panel of the invention.

The shredder roller assembly 55 as shown in FIGS. 1, 7 and 8 is retained in the body 11 and normally rests on plates 84.

A locking bar 85 is provided, pivotely attached to the side panel 44 of body 11 by a bolt 87 carried in a slot 88 of the bar 85.

Figure 4:
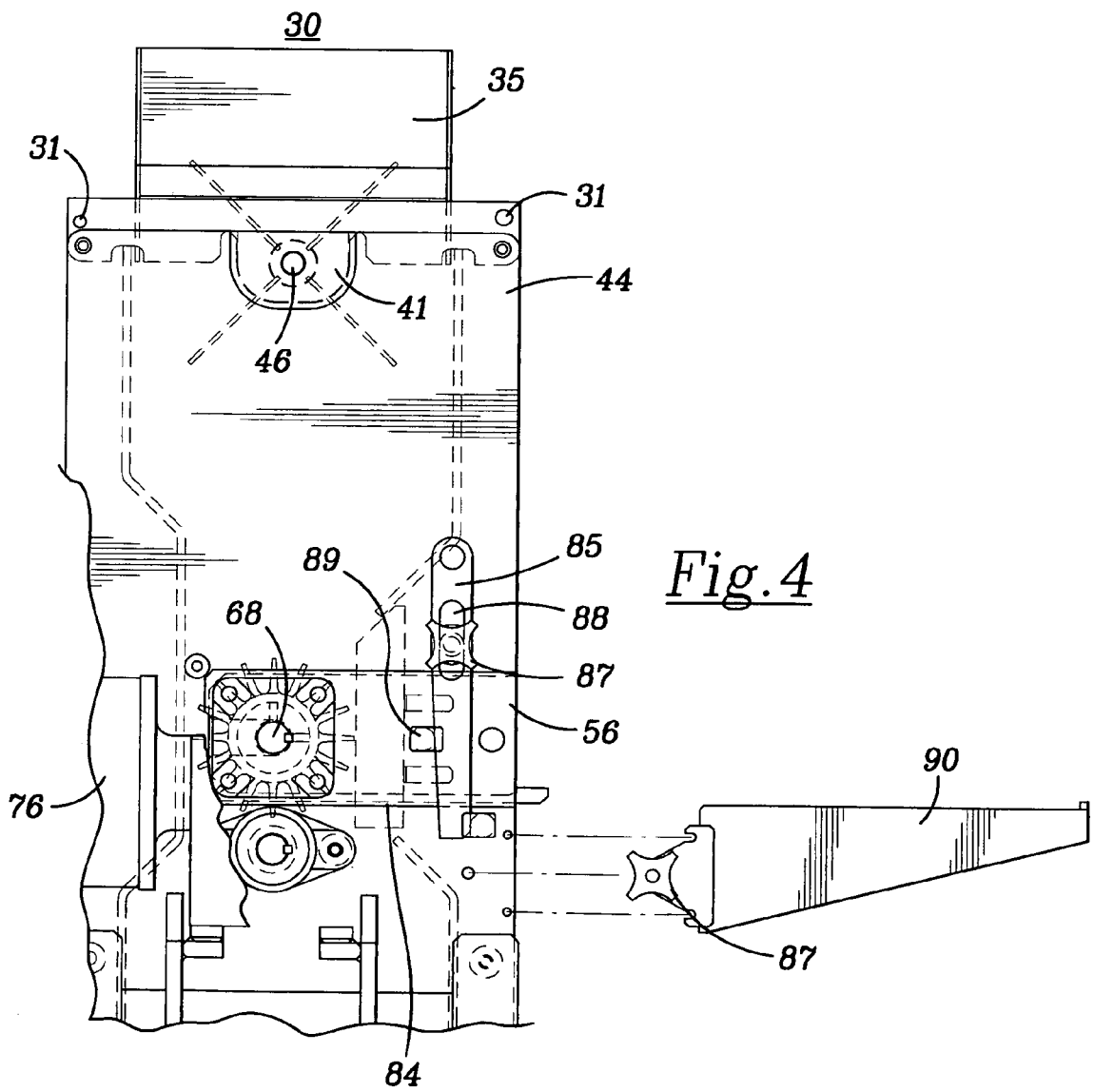
FIG. 4 is a is a fragmentary right side elevational view, in partial phantom, illustrating the apparatus in operating position with its washing extensions removed.
Figure 5:
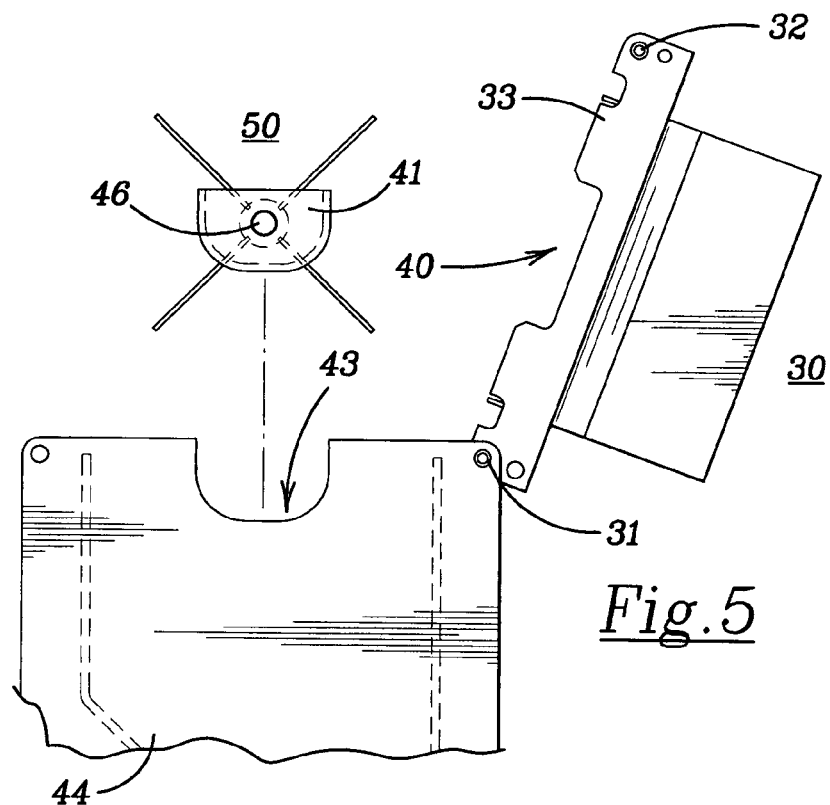
FIG. 5 is a fragmentary right side elevational view, showing the feed hopper in open position.
Figure 6:
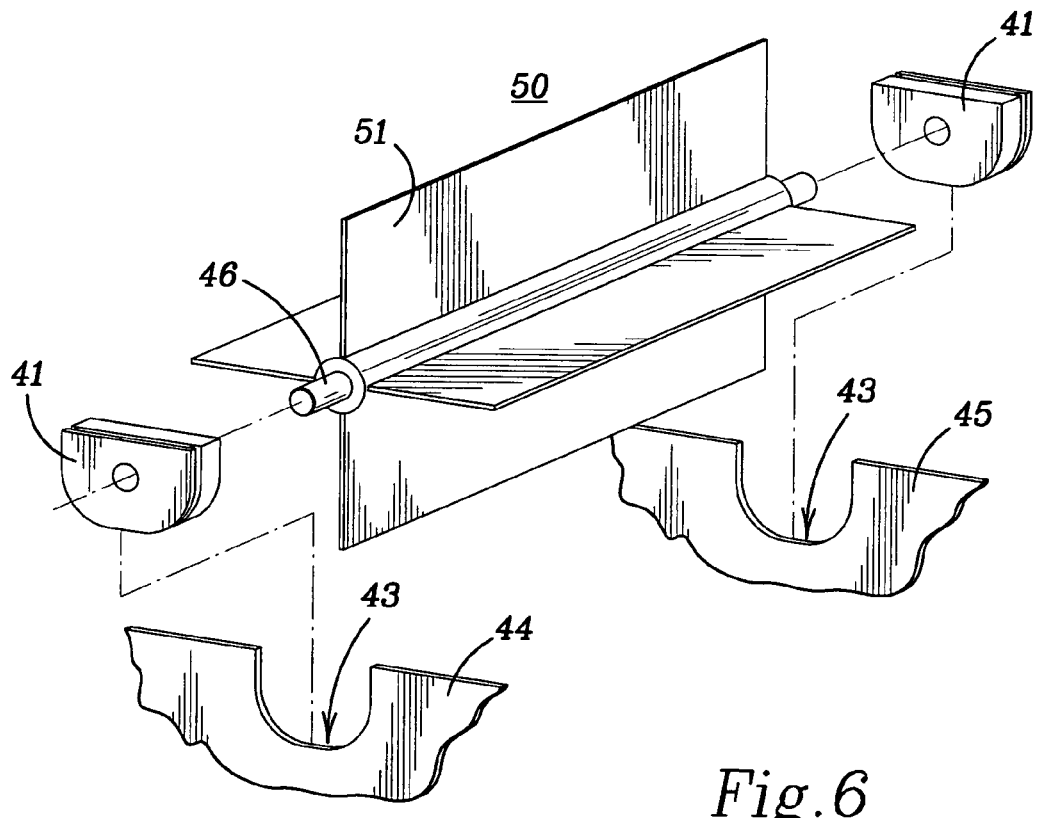
FIG. 6 is an enlarged, perspective, exploded view, of the paddle infeed wheel assembly of the apparatus.

As shown in FIGS. 1 and 4, bar 85 is engaged with bracket 89 on end plate 56 of shredder roller assembly 55, to retain the assembly in the body 11.

When it is desired to remove the shredder roller assembly 55 for cleaning or repair, the bolt 87 is loosened, and bar 85 is disengaged from bracket 89 washing extension brackets 90 are attached to panels 44 and 45 by wing nuts 87, and the roller assembly 55 is slid out thereon, as shown in FIGS. 7 and 8, whereby the shredder roller assembly 55 can be washed. When finished, the assembly 55 is slid back into body 11 onto plates 84, the bar 85 is engaged with bracket 89, bolt 87 is tightened and shredding operations can continue.

In use, the apparatus is activated by on off switches 81 and 82, which causes motor 76 to rotate gear 75 and gear 70 to rotate shredder roller 69. Backer plate 60 is adjusted to provide the desired texture of the finished product.

Pieces of meat (not shown) to be shredded or pulled, are introduced into hopper 30 and fed down into body 11 by rotation of the infeed wheel 51 and then down onto the rotating shredder roller 69. The meat is forced down by roller 69 and against backer plate 60 and shredded by the vanes 71. The finished product is delivered downwardly into tub 21 for further processing or use.

It will thus be seen that apparatus has been provided with which the objects of the invention are attained.

I claim:

1. Apparatus for shredding pieces of meat which comprises,
    an outer body,
    a frame supporting said outer body,
    a feed hopper assembly on said body for feeding pieces of meat therein to be shredded,
    said feed hopper assembly includes a pivotedly mounted hopper on said body,
    a rotatable paddle infeed wheel carried in bearings in said body and said hopper to feed said pieces of meat into said body for shredding,
    a shredder roller assembly in said body,
    said shredder roller assembly having a rotatable shredder roller and an adjustable backer plate, which can be moved towards or away from said roller to vary the texture of the finished meat product,
    said body having an electric motor thereon,
    said motor having an output shaft with a gear thereon,
    said shredder roller having an input shaft with a gear thereon which is selectively engageable with said gear on said motor shaft, whereby upon rotation of said-shredder roller paid pieces of meat are forced down between said roller and said plate, the passage therebetween thereby causing said pieces of meat to be shredded, and
    container means to receive said shredded meat.

2. Apparatus for shredding pieces of meat as defined in claim 1 in which,
    said roller assembly is retained in said body on plates by locking bar means,
    said body has detachable washing extension brackets attached thereto adjacent said roller assembly, and upon disengagement of said locking bar means said roller assembly maybe slid out onto said extensions for maintenance or replacement.

3. Apparatus for shredding pieces of meat as defined in claim 1 in which,
    the gear ratio between the motor output gear and the shredder input gear on the shredder roller can be varied to vary the rotational speed of the roller.

4. Apparatus for shredding pieces of meat as defined in claim 1 in which,
    said frame has a horizontal rack with spaced rods, and said container means is on said rack to receive shredded meat from said body.

* * * * *